(12) United States Patent
Shima et al.

(10) Patent No.: US 12,253,485 B2
(45) Date of Patent: Mar. 18, 2025

(54) COMBINATION WEIGHING DEVICE WITH WATER INTRUSION DETECTION

(71) Applicant: Ishida Co., Ltd., Kyoto (JP)

(72) Inventors: Shigeki Shima, Ritto (JP); Nobuki Hashiguchi, Ritto (JP); Mitsuki Nakai, Ritto (JP); Takuma Furukawa, Ritto (JP); Kazuteru Oda, Ritto (JP); Toshiharu Kageyama, Ritto (JP); Kazuhisa Chimura, Ritto (JP)

(73) Assignee: Ishida Co., Ltd., Kyoto (JP)

( * ) Notice: Subject to any disclaimer, the term of this patent is extended or adjusted under 35 U.S.C. 154(b) by 565 days.

(21) Appl. No.: 17/591,860

(22) Filed: Feb. 3, 2022

(65) Prior Publication Data

US 2022/0260514 A1   Aug. 18, 2022

(30) Foreign Application Priority Data

Feb. 17, 2021   (JP) ................. 2021-023515

(51) Int. Cl.
*G01N 27/04*   (2006.01)
*G01G 19/387*  (2006.01)
*G01G 23/01*   (2006.01)

(52) U.S. Cl.
CPC ......... *G01N 27/048* (2013.01); *G01G 19/387* (2013.01); *G01G 23/01* (2013.01)

(58) Field of Classification Search
CPC .... G01G 19/387; G01G 19/393; G01G 23/00; G01G 23/01; G01N 27/048
See application file for complete search history.

(56) References Cited

U.S. PATENT DOCUMENTS

| 2013/0170786 A1* | 7/2013 | Wang ................ G01N 21/552 385/12 |
| 2016/0216801 A1* | 7/2016 | Shedletsky .......... G06F 3/0412 |
| 2019/0290137 A1 | 9/2019 | Zhang et al. |

(Continued)

FOREIGN PATENT DOCUMENTS

| CN | 205748609 U | 11/2016 |
| CN | 210273534 U | 4/2020 |

(Continued)

OTHER PUBLICATIONS

The extended European search report issued by the European Patent Office on Jul. 14, 2022, which corresponds to European Patent Application No. 22155503.0-1001 and is related to U.S. Appl. No. 17/591,860.

(Continued)

*Primary Examiner* — Natalie Huls
(74) *Attorney, Agent, or Firm* — Studebaker Brackett PLLC (57) ABSTRACT

A combination weighing device includes: an electroconductive plate opposed, with an interval, to an electroconductive part enabling detection of water intrusion inside the combination weighing device; a voltage wire for application of voltage to the electroconductive plate; and a detector that detects a potential difference between the electroconductive part and the electroconductive plate, wherein the detector or a controller of the combination weighing device determines presence or absence of water intrusion inside the interval, based on the detected potential difference.

8 Claims, 8 Drawing Sheets

(56)  References Cited

U.S. PATENT DOCUMENTS

| 2022/0161947 | A1* | 5/2022 | Petri | A23P 20/10 |
| 2023/0091619 | A1* | 3/2023 | Nagai | B65G 27/08 |
| | | | | 177/25.18 |
| 2024/0191893 | A1* | 6/2024 | Carlay, II | F24F 13/0218 |

FOREIGN PATENT DOCUMENTS

| JP | H076889 U | * | 1/1995 |
| JP | 2004-235724 A | | 8/2004 |
| JP | 3692234 B2 | | 9/2005 |
| JP | 6050690 B2 | | 12/2016 |
| KR | 200177655 Y1 | * | 4/2000 |

OTHER PUBLICATIONS

Choi Jin Moon et al., "Humidity Sensor Using an Air Capacitor," Transactions on Electrical and Electronic Materials, vol. 14, No. 4, Aug. 25, 2013, pp. 182-186, The Korean Institute of Electrical and Electronic Material Engineers.

GAI at al.; "Present Situation of Water Inlet Monitoring Technology for Insulation Layer in Insulation Pipeline"; Pipeline Technique and Equipment; No. 5; Sep. 2017; 3 pages; with English abstract.

An Office Action mailed by the State Intellectual Property Office of the People's Republic of China on Jun. 26, 2024, which corresponds to Chinese Patent Application No. 202210143039.3 and is related to U.S. Appl. No. 17/591,860; with English language translation.

An Office Action mailed by China National Intellectual Property Administration on Nov. 6, 2024, which corresponds to Chinese Patent Application No. 202210143039.3 and is related to U.S. Appl. No. 17/591,860; with English language translation.

* cited by examiner

COMBINATION WEIGHING DEVICE WITH WATER INTRUSION DETECTION

CROSS-REFERENCE TO RELATED APPLICATIONS

This application is based upon and claims the benefit of priority from Japanese Patent Application No. 2021-023515 filed on Feb. 17, 2021 in Japan, the entire contents of which are incorporated herein by reference.

TECHNICAL FIELD

The present disclosure relates to a combination weighing device that detects water having intruded inside the combination weighing device in order to prevent corrosion inside the device.

BACKGROUND ART

A combination weighing device that performs weighing to food so as to obtain a certain weight of food, is waterproof for daily cleaning. Thus, an opening through which a weighing hopper exposed outside and an internal load cell are connected is occluded with a diaphragm, and an opening through which a vibration trough exposed at the upper portion of the device and an electromagnetic vibrator inside a casing are connected is occluded with a bellows. However, because such a diaphragm or bellows is formed of a thin silicon rubber, the diaphragm or bellows is damaged due to deterioration over time or due to high-pressure cleaning water. Thus, in some cases, cleaning water intrudes inside the device through the damaged diaphragm or bellows.

In particular, a weighing device that deals with food is sterilized/disinfected with sodium hypochlorite. If sodium hypochlorite intrudes inside the device, an electrically conductive part (hereinafter, referred to as an electroconductive part) inside the device corrodes. As an exemplary device that detects water intrusion, known has been a detection device disclosed in JP 3692234 B2.

SUMMARY OF THE INVENTION

Technical Problem

The detection device disclosed in JP 3692234 B2 includes a strain gauge that is provided at an axle of a truck and detects overloading, in which the strain gauge further serves as a water-intrusion sensor, and water intrusion into the axle is detected on the basis of comparison between the resistance value of the strain gauge wet and the resistance value of the strain gauge dry.

Meanwhile, a combination weighing device includes diaphragms and bellows that are likely to be damaged, provided at at least 20 or more locations. Thus, from a viewpoint of cost performance, it is unfeasible to dispose expensive strain gauges in proximity thereto in order to detect water intrusion.

Even if strain gauges are provided at limited locations at which water is highly likely to stay inside the device, with current flowing in the strain gauges, it is necessary to observe a change in the resistance value from the normal state of each strain gauge. Thus, from a viewpoint of power saving, such an arrangement is unfavorable.

Moreover, the device is cleaned with its power switch off. Thus, even when water intrudes inside the device, at the timing, no water intrusion can be detected. If the water inside the device evaporates by the next resumption of operation, even when the power is turned on at the time of the next resumption of operation, no water intrusion can be detected. Therefore, after a situation arises where damage becomes worse and water intrudes and stays inside the device, water intrusion is detected, resulting in inevitable corrosion of an electroconductive part.

The present invention has been made in order to solve such problems, and an object of the present invention is to provide a new combination weighing device enabling detection of water intrusion inside the device with an inexpensive configuration.

Solution to Problem

A combination weighing device according to one embodiment is summarized as including: an electroconductive plate opposed, with an interval, to an electroconductive part enabling detection of water intrusion inside the combination weighing device; a voltage wire for application of voltage to the electroconductive plate; and a detector that detects a potential difference between the electroconductive part and the electroconductive plate, wherein the detector or a controller of the combination weighing device determines presence or absence of water intrusion inside the interval, based on the detected potential difference.

A waterproof combination weighing device has a housing itself formed of an electroconductive material, such as iron, aluminum, or stainless steel. For example, a drive weighing unit and an electronic device electrically connected thereto are housed in the housing. Thus, the housing corresponds to an electroconductive part. At the upper portion of the housing, installed is a plurality of vibration feeders that supplies subdivided articles to a plurality of hoppers. The base part at which the vibration feeders are installed, namely, the top of the housing corresponds to an electroconductive part. In addition, metallic parts at which condensation occurs correspond to electroconductive parts.

From among such electroconductive parts, particularly, an electroconductive part at a location that gets wet due to water having intruded inside the device or a location at which water is likely to stay, and an electroconductive plate are opposed to each other with a predetermined interval. For example, the interval in this case achieves electrical insulation when no water has intruded in the interval. When water intrudes in the interval, the intruded water is retained in the interval. Then, after resumption of operation, for example, at the timing of initial setting of the device, a predetermined voltage is applied across the electroconductive plate and the electroconductive part, and the potential difference therebetween is detected by a detector. If the detected potential difference is almost equivalent to the applied voltage, it is determined that no water has intruded inside the device. If the detected potential difference is less than the applied voltage, it is determined that water has intruded inside the device. This is because the water having intruded between the electroconductive plate and the electroconductive part causes a short circuit between the electroconductive plate and the electroconductive part, resulting in a drop in the applied voltage.

The potential difference in the short circuit varies depending on the electroconductivity of the water contained therebetween. Thus, various types of cleaning water that a user uses are each made contained between the electroconductive plate and the electroconductive part, and the potential difference at the time is checked, resulting in obtainment of the potential difference enabling reliable detection of the presence or absence of water. The obtained potential difference is stored in a detector to be described below or a controller for the device. With the potential difference as a threshold, the detector or controller determines the presence or absence of water intrusion. Thus, the presence or absence of water intrusion can be reliably detected on the basis of the threshold. With no water intrusion, no current flows between the electroconductive plate and the electroconductive part. Thus, the power consumption can be restrained at the time of inspection of water intrusion, in comparison to the conventional device disclosed in JP 3692234 B2.

Preferably, the electroconductive plate and the electroconductive part in a pair are disposed at a plurality of locations. In this case, a detector may be provided for each pair. However, from a viewpoint of cost performance, preferably, a detector having a plurality of input channels is provided. Therefore, the potential differences at the plurality of locations can be sequentially checked by sequential switching between the input channels. Thus, from where water has intruded among a larger number of installation places can be specified with a smaller number of detectors.

In a case where an electroconductive plate is installed at a place at which water stays, an electroconductive plate shaped so as to cover a plurality of locations in which water is likely to flow, may be provided, so that, even if water flows in from somewhere, the water can be reliably detected. For example, a plurality of electromagnetic feeders is arranged radially inside a casing at the upper portion of the device, and a step portion like a tub recessed downward is provided at the central portion of the radial shape. Against water that flows in such a step portion, a ring-shaped electroconductive plate is disposed thereat. Even if water flows in from somewhere, the water can be reliably detected with the ring-shaped electroconductive plate.

Preferably, the interval between the electroconductive plate and the electroconductive part retains, when water intrudes therein, the water due to the surface tension of water. For example, the interval is approximately 0.5 to 2 mm in size. Note that, because the surface tension of water depends on temperature or the impurities contained in water, the interval described above is just exemplary and thus the above numeric range is not limiting.

Provision of such an interval enables, with a reduction in the contact area of water having intruded therein to the air, restraint of the evaporation of water. Thus, even if the period lengthens from the point in time of water intrusion inside the device to the time of the next resumption of operation, the water intrusion inside the device can be detected on the basis of the water retained therein.

In order to keep the interval certain, for example, used is a double-sided adhesive tape having insulation. Therefore, the electroconductive plate can be easily attached, with a certain interval, to an appropriate place on the electroconductive part. Examples of the base material of such a double-sided adhesive tape include water-absorbent base materials, such as nonwoven fabric, cloth, and paper, and water-repellent base materials, such as polyurethane. A double-sided adhesive tape having any of the base materials may be used. For example, when a double-sided adhesive tape having a water-absorbent base material is used, the double-sided adhesive tape is cut larger in size than the electroconductive plate such that the base material gets wet actively. When a double-sided adhesive tape having a water-repellent base material is used, provided is an area where no double-sided adhesive tape is present between the electroconductive plate and the electroconductive part. For example, a double-sided adhesive tape is attached such that an area where no double-sided adhesive tape is present is provided at the circumferential portion of the electroconductive plate. Alternatively, a plurality of double-sided adhesive tapes small in area is attached at intervals to a single electroconductive plate. Therefore, water having intruded can be retained at the circumferential portion of the electroconductive plate attached to the electroconductive part or between the plurality of double-sided adhesive tapes attached at intervals. Therefore, any double-sided adhesive tape having insulation and having a thickness enabling formation of a gap in which water can be retained may be provided, regardless of its base material.

The detector serves as an analog/digital converter (AD converter) that inputs the potential difference between the electroconductive plate and the electroconductive part and converts the potential difference into digital quantity for output. When the detector is achieved by a microprocessor that performs AD conversion due to execution of a program, on the basis of the threshold, the microprocessor may determine whether or not water has intruded between the electroconductive plate and the electroconductive part. Instead of this, on the basis of the digital quantity input from the detector and the stored threshold, the controller for the combination weighing device may determine whether or not water has intruded in the gap between the electroconductive plate and the electroconductive part.

In a case where a plurality of electroconductive plates is disposed at a plurality of locations, preferably, a detector having a plurality of input channels is used. More preferably, the detector has a plurality of output channels for selective application of a predetermined voltage to the plurality of electroconductive plates. Therefore, such a single detector selects one electroconductive plate from a plurality of electroconductive plates, applies a voltage thereto, and then inputs the applied voltage from the selected electroconductive plate, so that the potential difference between the electroconductive plate and the electroconductive part can be checked.

Advantageous Effects of Invention

According to an embodiment of the present invention, on the basis of the potential difference between an electroconductive plate and an electroconductive part opposed to each other with a predetermined interval, the presence or absence of water intrusion inside an device can be detected. Thus, even for a combination weighing device having a plurality of locations at which water intrusion is likely to occur, water intrusion can be detected with proper cost performance. With no water intrusion, no current flows between the electroconductive plate and the electroconductive part. Thus, the power consumption can be restrained at the time of inspection of the presence or absence of water intrusion. Moreover, when water intrudes inside the device, the water is retained in the gap between the electroconductive plate and the electroconductive part for a long time. Thus, even if the period lengthens from the time of cleaning of the device to the time of the next resumption of operation, the water having intruded can be detected with restraint of the evaporation of water during the period.

DESCRIPTION OF EMBODIMENTS

A combination weighing device according to an embodiment of the present invention will be described below with reference to the drawings. Note that the technical scope of the present invention is not limited to the following embodiment.

Figure 1:
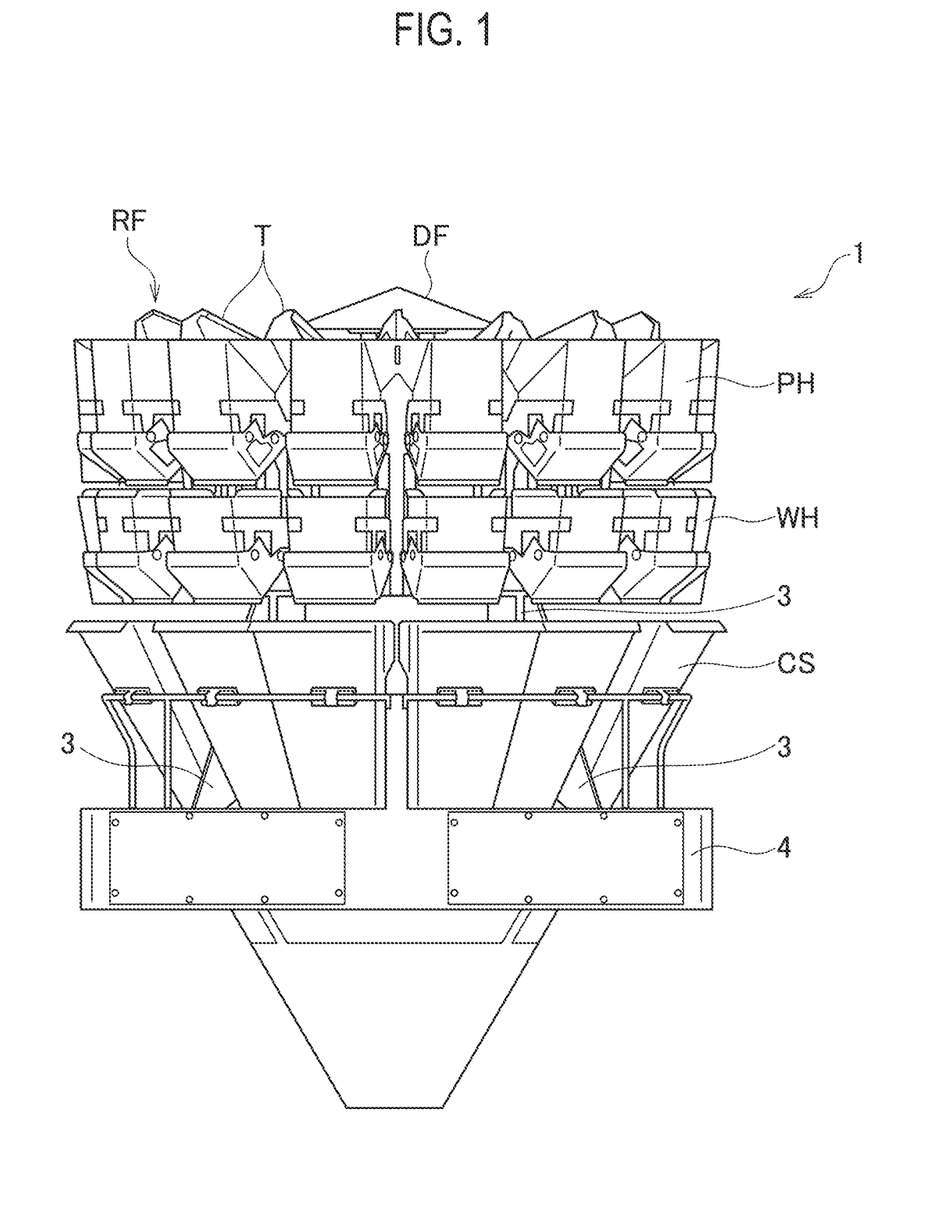
FIG. 1 is a front external view of a combination weighing device according to an embodiment of the present invention.
Figure 2:
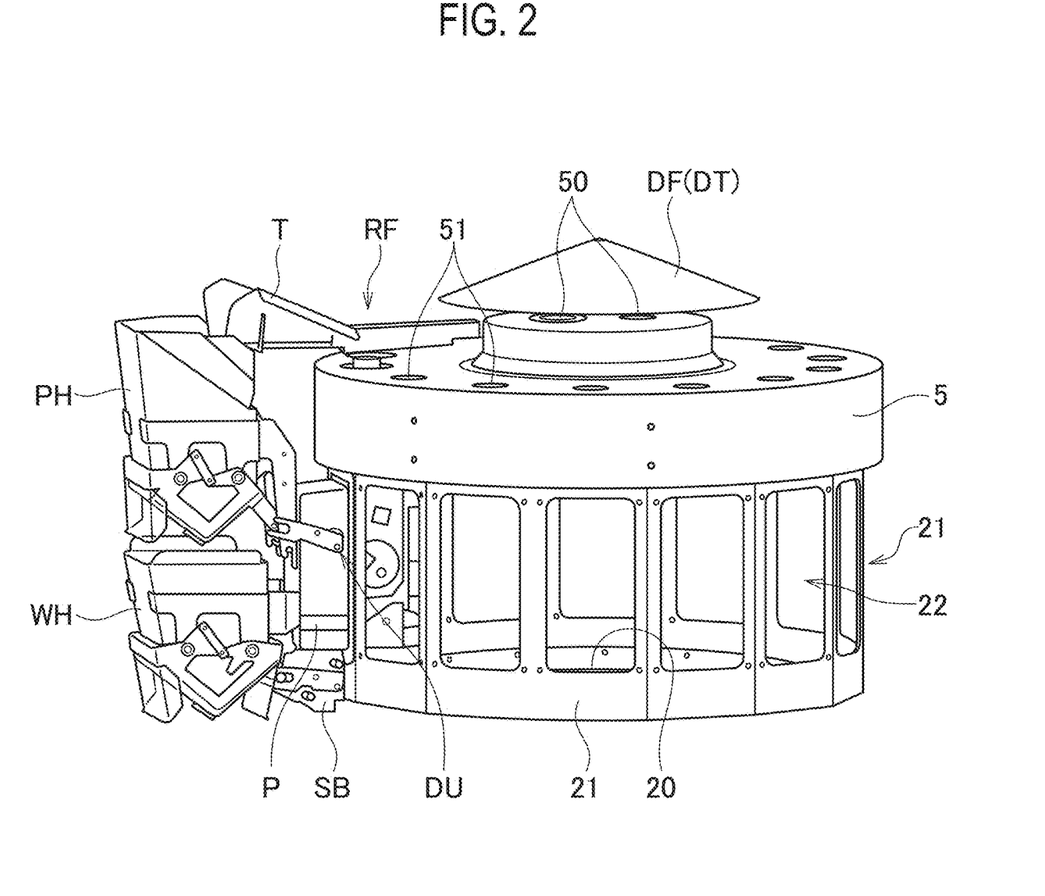
FIG. 2 is a perspective external view of a housing of the combination weighing device of FIG. 1, with one unit including an upper radial feeder, an intermediate pool hopper, and a lower weighing hopper, but without the other units.

Referring to FIG. 1, externally, a combination weighing device 1 includes: a distribution feeder DF that is disposed at the central upper portion of the device and distributes, in various directions, articles fed from above; a plurality of radial feeders RF that is arranged radially around the distribution feeder DF and receives the articles supplied from the distribution feeder DF and conveys the articles downstream, through troughs T arranged radially; an upper pool hopper PH that is disposed at the downstream end portion of each radial feeder RF and receives the articles discharged from the trough T; a weighing hopper WH that is disposed therebelow and receives and weighs the articles discharged from the pool hopper PH; a collecting chute CS that is arranged below each weighing hopper WH and collects the articles discharged from the weighing hopper WH to discharge the collected articles to a packing device not illustrated; a housing 2 having the distribution feeder DF and the radial feeders RF on its upper portion and housing the pool hoppers PH and the weighing hoppers WF, and respective drive weighing units DU therefor, as illustrated in FIG. 2; four support legs 3 supporting the bottom face of the housing 2 from below; and a base 4 supporting the respective lower end portions of the support legs 3. Note that, in the following description, the distribution feeder DF and the radial feeders RF are each generically referred to as a vibration feeder BF, in some cases.

Figure 3:
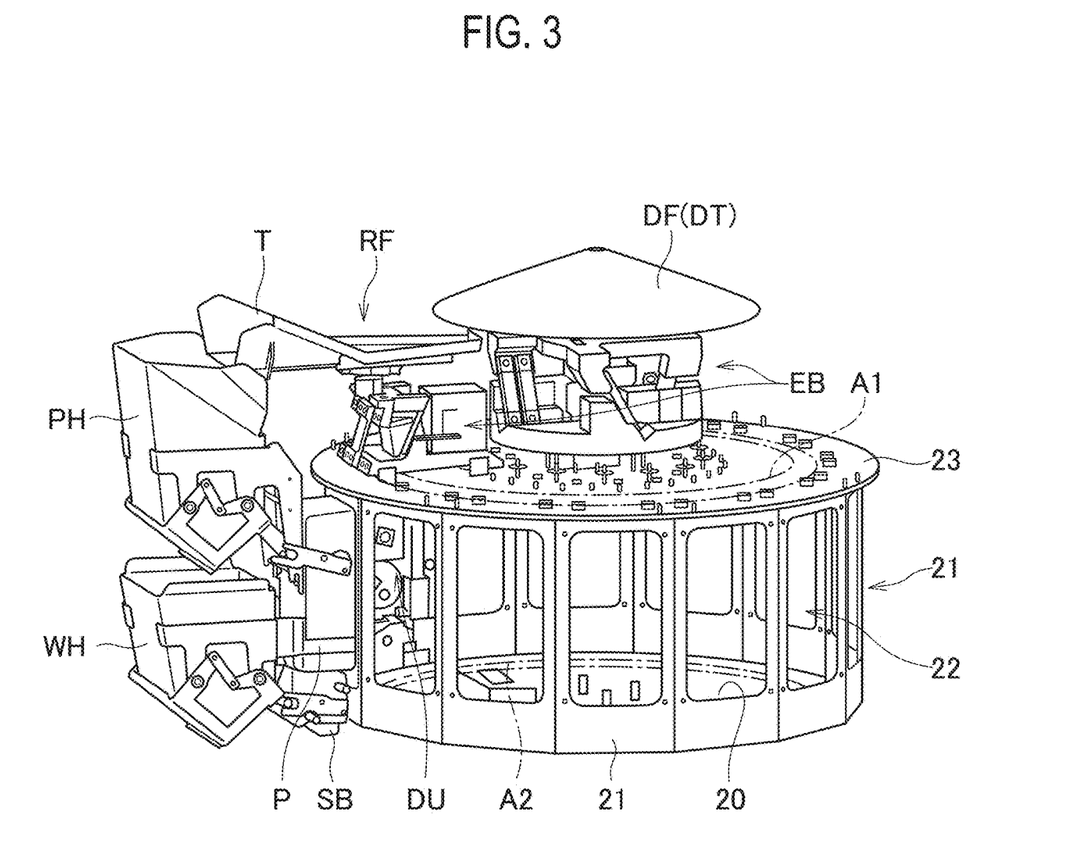
FIG. 3 is a perspective external view of a state resulting from removal of a casing that covers respective electromagnetic vibrator parts for the radial feeder and a distribution feeder, from the perspective external view of FIG. 2.

FIG. 2 is a perspective external view of the housing 2 of the combination weighing device 1 of FIG. 1, with one unit including an upper radial feeder RF, an intermediate pool hopper PH, a lower weighing hopper WH, and a drive weighing unit DU that supports or drives the upper radial feeder RF, the intermediate pool hopper PH, or the lower weighing hopper WH, but without the other units. FIG. 3 is a perspective external view of a state resulting from removal of a casing 5 that covers respective vibrator bodies EB for the vibration feeders BF, from the perspective external view of FIG. 2.

Referring to FIGS. 2 and 3, the upper face of the casing 5 that covers the respective vibrator bodies EB for the vibration feeders BF has a central portion and a circumferential portion lower than the central portion. The higher central portion is provided with two openings 50, and the lower circumferential portion is provided with fourteen openings 51. The two openings 50 serve as holes through which a distribution table DT exposed outside and the corresponding vibrator body EB inside the casing 5 are coupled. The openings 50 are covered with rubber bellows. Similarly, the fourteen openings 51 at the circumferential portion serve as holes through which the troughs T of the radial feeders RF exposed outside and the corresponding vibrator bodies EB inside the casing 5 are coupled. The openings 51 are covered with bellows against water intrusion.

Figure 4:
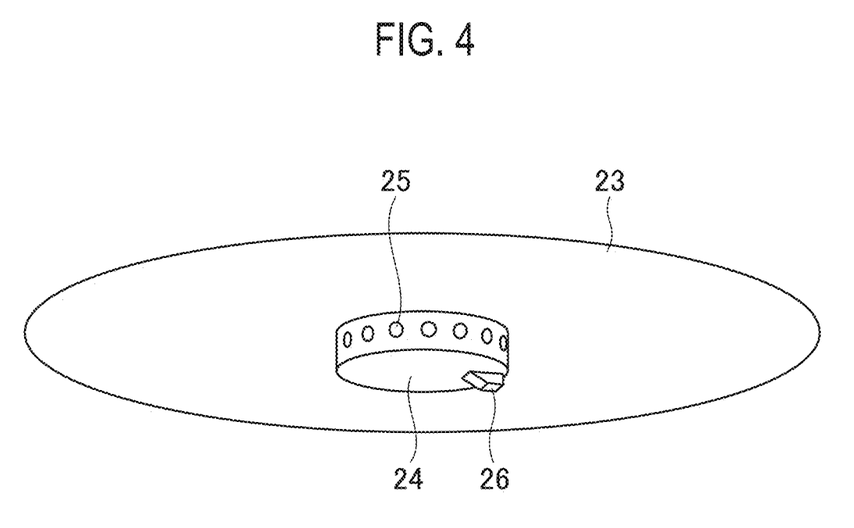
FIG. 4 is a perspective external view of a top covering the housing of FIG. 3 when viewed from below.

Note that, although the bellows have been removed in FIG. 2, if any of the bellows is damaged, water is likely to intrude inside the casing 5 therethrough. Thus, the bottom portion of the casing 5, namely, the central portion of a top 23 covering the housing 2 to be described below is provided with a step portion 24 like a tub recessed downward, as illustrated in FIG. 4. The step portion 24 is provided with a plurality of cable through holes 25 through which the vibrator bodies EB and a controller 8 to be described below are electrically connected. Against water having intruded inside the casing 5, the bottom of the step portion 24 is provided with an outlet 26, and a hose, not illustrated, connected to the outlet 26 passes inside the housing 2, the support legs 3, and the base 4 and leads outside the device. Note that FIG. 4 is a perspective view of the top 23 viewed from below.

The housing 2 having a bottom face 20 and fourteen side faces 21 is made by aluminum die casting and is shaped like a tub and like a tetradecagon in plan view. The fourteen side faces 21 are each provided with a rectangular opening 22. The top 23 that is made of stainless steel and is discoid in shape is provided as a ceiling. On the top 23, attached are fourteen vibrator bodies EB for the radial feeders RF and a vibrator body EB for the distribution feeder DF.

The openings 22 of the housing 2 are each fitted with a drive weighing unit DU through a gasket not illustrated, achieving a waterproof structure. Note that, inside each drive weighing unit DU, attached is a load cell that detects the weight of the weighing hopper WH. An opening through which the free end portion of the load cell and a support block SB for the weighing hopper WH are connected is provided at the bottom of a projection P of the drive weighing unit DU protruding outward from the corresponding side face 21 of the housing 2. The opening is covered with a diaphragm not illustrated such that water is prevented from intruding inside the housing 2. Therefore, if the diaphragm is damaged, water is likely to intrude inside the housing 2 from above the support block SB.

Thus, in the present embodiment, an electroconductive plate is attached with a predetermined interval to an electroconductive part enabling detection of water intrusion inside the housing 2 or water intrusion inside the casing 5. Specifically, a location at which water intrusion may occur inside the casing 5 is the face on which each vibrator body EB is installed, immediately under the bellows. Referring to FIG. 3, the location corresponds to a ring-shaped area A1 indicated with dashed lines on the top 23. A location at which water intrusion may occur inside the housing 2 corresponds to a ring-shaped area A2 indicated with other dashed lines on the bottom face 20 close to each load cell. A place at which water stays is, for example, the bottom face inside the step portion 24 in FIG. 4. The areas A1 and A2 and the bottom face inside the step portion 24 each correspond to an electroconductive part CD having a high electroconductivity, and thus are each attached with an electroconductive plate CP through a double-sided adhesive tape AT, as illustrated in FIGS. 5 to 7.

Figure 5:
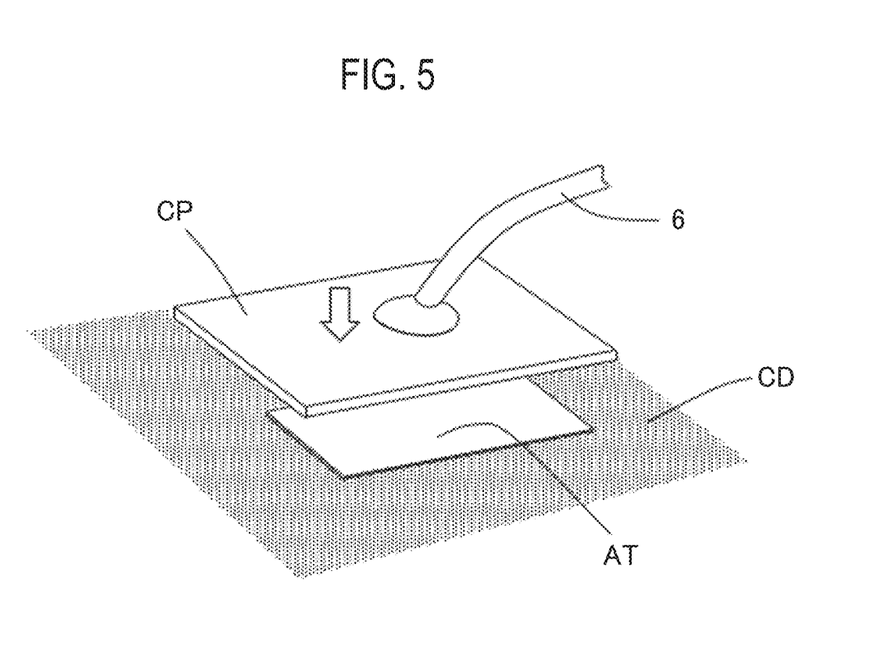
FIG. 5 is an explanatory view of a process in which an electroconductive plate is attached to an electroconductive part through a double-sided adhesive tape smaller in area than the electroconductive plate.
Figure 8:
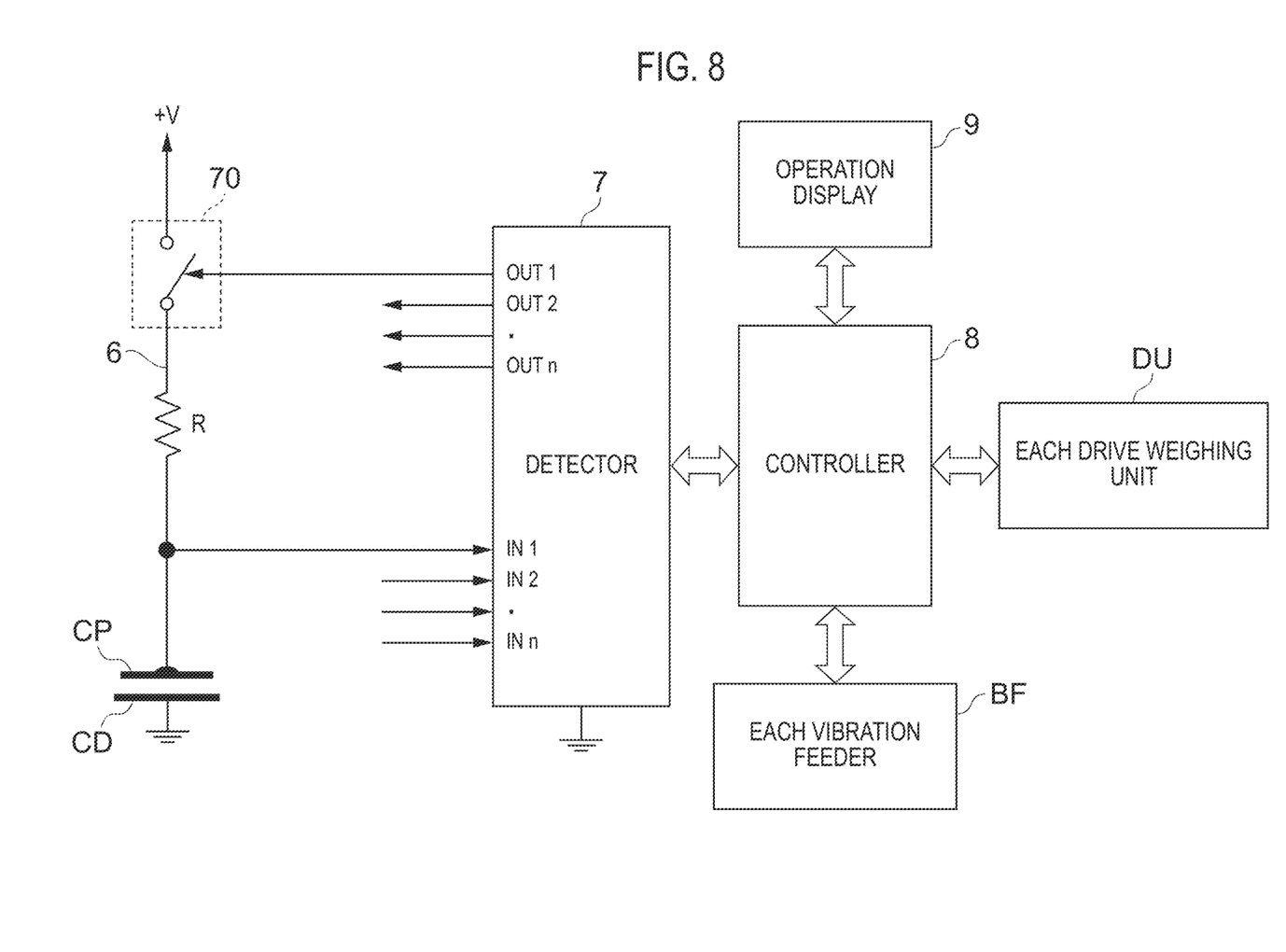
FIG. 8 is a block diagram of a configuration enabling detection of the presence or absence of water intrusion inside the device, based on the potential difference between an electroconductive part and an electroconductive plate.

FIG. 5 illustrates a process in which an electroconductive plate CP is attached to an electroconductive part CD through a double-sided adhesive tape AT smaller in area than the electroconductive plate CP. In the figure, for example, the electroconductive plate CP is formed of an aluminum plate or a copper plate. The electroconductive plate CP and a lead wire 6 are joined together with solder. Instead of this, provided may be a structure including an electroconductive plate CP, a stud bolt, a nut, and a lead wire 6 having a ring terminal connected thereto, in which the ring terminal of the lead wire 6 is fastened, through the nut, to a bolt portion protruding from the electroconductive plate CP due to the stud bolt screwed in the electroconductive plate CP. As illustrated in FIG. 8, the lead wire 6 is connected to an input channel IN and an output channel OUT in a detector 7 through a switch 70 and a pull-up resistor R. Thus, the lead wire 6 corresponds to a voltage wire in the claims.

For example, the double-sided adhesive tape AT has a thickness of approximately 1 mm and an attachment area smaller than the area of the electroconductive plate CP. Thus, attachment of the electroconductive plate CP to the electroconductive part CD through the double-sided adhesive tape AT causes formation of a gap in which no double-sided adhesive tape AT is interposed, between the electroconductive plate CP and the electroconductive part CD. If water comes in contact with the gap, the water intrudes in the gap. Therefore, the electroconductive plate CP can be attached, through the double-sided adhesive tape AT, to any location that gets wet due to water having intruded inside the casing 5 or inside the housing 2 or to any location at which condensation occurs.

Figure 6:
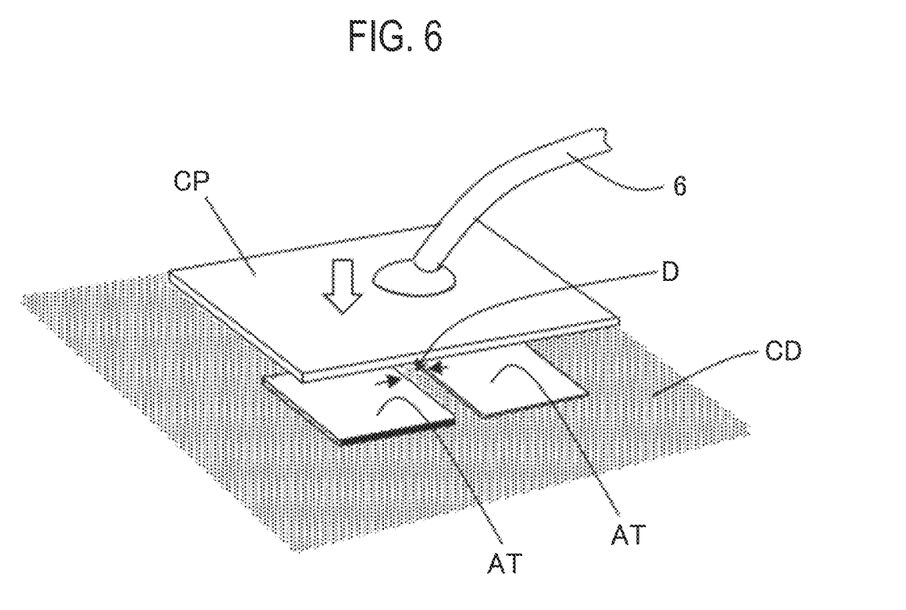
FIG. 6 is an explanatory view of a process in which an electroconductive plate is attached to an electroconductive part through left and right double-sided adhesive tapes separated by an interval enabling retention of water.
Figure 7:
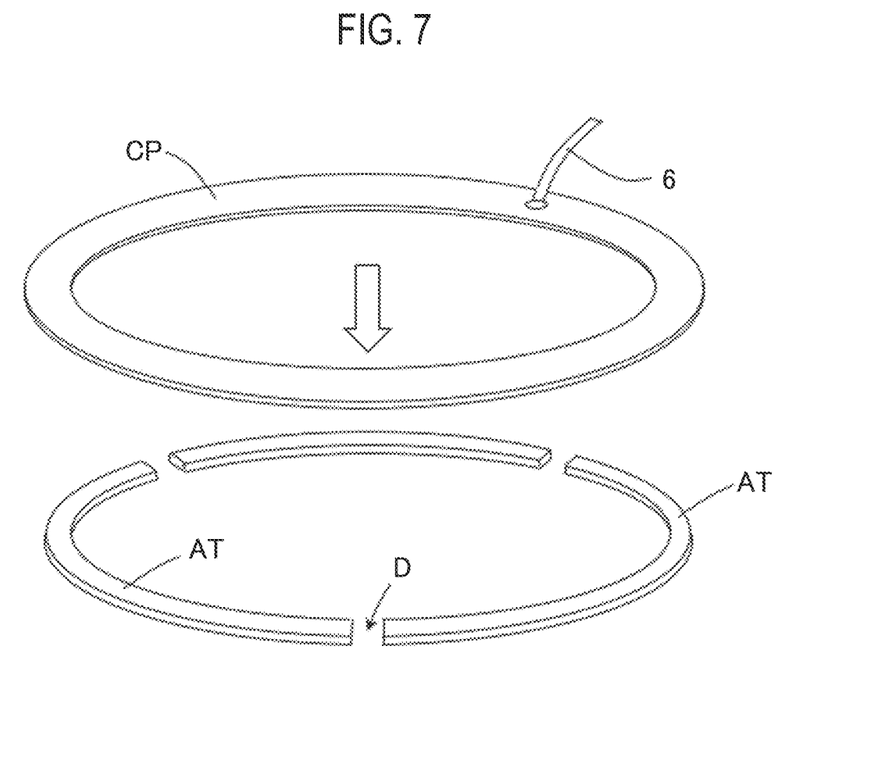
FIG. 7 is a perspective external view of a ring-shaped double-sided adhesive tape including a plurality of arches and a ring-shaped electroconductive plate corresponding in size thereto.

FIG. 6 illustrates a process in which an electroconductive plate CP is attached to an electroconductive part CD through left and right double-sided adhesive tapes AT separated by an interval D enabling retention of water. In this case, the left and right double-sided adhesive tapes AT each have a thickness of approximately 1 mm and an attachment area further smaller than the area of the electroconductive plate CP. Thus, between the electroconductive plate CP and the electroconductive part CD, a gap in which no double-sided adhesive tapes AT are interposed is formed so as to surround the double-sided adhesive tapes AT. If water comes in contact with the gap, the water intrudes in the gap, so that the water is retained in the gap. In this case, the water intrudes and is retained not only in the periphery of the left and right double-sided adhesive tapes AT but also in the gap between the left and right double-sided adhesive tapes AT. Thus, evaporation of the retained water can be restrained.

FIG. 7 illustrates an exemplary electroconductive plate CP for the ring-shaped areas A1 and A2 described above and an exemplary double-sided adhesive tape AT corresponding thereto. In the embodiment, the electroconductive plate CP is shaped like a ring. However, the electroconductive plate CP may be divided into a plurality of arches in order to restrain thermal deformation. The attachment area of the double-sided adhesive tape AT including a plurality of arches is smaller than the area of the ring-shaped electroconductive plate CP. A gap in which water intrudes is formed between the electroconductive plate CP and the corresponding electroconductive part CD, the gap including the intervals D between the plurality of arches of the double-sided adhesive tape AT.

FIG. 8 is a block diagram of an exemplary configuration enabling, based on the potential difference between each of a plurality of electroconductive plates CP provided at a plurality of locations and the corresponding electroconductive part CD, detection of the presence or absence of water at each of the plurality of locations. In the figure, for example, several volts of voltage are selectively applied to an electroconductive plate CP through a switch 70, a lead wire 6, and a pull-up resistor R. The detector 7 that detects the potential difference between the electroconductive plate CP and the electroconductive part CD is achieved by a microprocessor that performs AD conversion due to execution of a program. The microprocessor (detector 7) has a plurality of output channels OUT and a plurality of input channels IN identical in number. In the figure, for convenience in description, given is a configuration in which the potential difference between an electroconductive plate CP and an electroconductive part CD in a pair is detected with an output channel OUT1 and an input channel IN1 in a pair. Similarly, an output channel OUTn and an input channel INn in another pair are connected to an electroconductive plate CP and an electroconductive part CD in another pair.

Referring to FIG. 8, when detecting the potential difference between the electroconductive plate CP and the electroconductive part CD, first, the microprocessor 7 outputs a signal to the switch 70 through the output channel OUT1 to turn on the switch 70. Then, several volts of voltage are applied to the electroconductive plate CP. Next, the microprocessor 7 inputs the applied voltage at the electroconductive plate CP through the input channel IN1. That is, the microprocessor 7 inputs the potential difference between the electroconductive plate CP and the electroconductive part CD. Next, the microprocessor 7 performs delta-sigma AD conversion to convert the input analog quantity to digital quantity. Then, in comparison between the potential difference in the digital quantity and the stored threshold, the microprocessor 7 inspects whether or not water is contained in the gap between the electroconductive plate CP and the electroconductive part CD. As a result of inspection, in a case where no water is contained, the microprocessor 7 does nothing. In a case where water is contained, the microprocessor 7 notifies the controller 8 for the device that water has been detected. In the latter case, the microprocessor 7 also notifies the controller 8 of the location of the electroconductive plate CP and the electroconductive part CD between which water is contained.

The controller 8 is achieved by a computer built inside the base 4. When starting operating, the computer inquires the presence or absence of water intrusion of the microprocessor 7. To the inquiry, the microprocessor 7 sequentially inspects, with sequential switching in the output channel OUTn and the input channel INn in a pair, the potential difference between the electroconductive plate CP and the electroconductive part CD. Then, if water is detected, the controller 8 is notified of the presence of water intrusion and information indicating the location of water intrusion, for example, the unit number given to the unit in which water has intruded, from the unit numbers given to the drive weighing units DU.

The controller 8 having been notified causes an operation display 9 in the device to display warning information indicating the unit number and the presence of water intrusion in the unit. On the basis of the warning information, an operator replaces, in non-operation, the damaged diaphragm or bellows.

In the above description, the switches 70 to the microprocessor 7 are external. However, a microprocessor having such switches 70 built in may be provided such that a predetermined voltage is selectively applied to the electroconductive plate CP for the designated unit by switching between the output channels OUT.

For calibration of the applied voltage to be output at each electroconductive plate CP, for example, at the time of replacement of the substrate having the microprocessor 7 implemented thereon, preferably, respective input voltages at the input channels IN due to application of a predetermined voltage to the output channels OUT are checked, and calibration is performed such that each input voltage is equal to the applied voltage.

Due to execution of a built-in program, the controller 8 repeats the following processing cycle. For example, with the pool hoppers PH and the weighing hoppers WH supplied with articles, the controller 8 inputs an output from the road cell of each drive weighing unit DU, obtains the weight of articles in each weighing hopper WH, and obtains an optimum combination closest to the target weight by combination of the obtained weights of articles. Next, the articles are discharged from the weighing hoppers WH having the articles according to the obtained optimum combination. Then, the pool hoppers PH corresponding to the selected optimum combination are operated to supply the articles to the empty weighing hoppers WH. Next, the radial feeders RF corresponding to the empty pool hoppers PH are driven to supply articles from the radial feeders RF to the pool hoppers PH. In this manner, the controller 8 repeats one cycle including weighing with the weighing hoppers WH, combination computation, discharging of the articles in the selected optimum combination, supply of articles to the empty weighing hoppers WH, and then supply of articles to the pool hoppers PH.

The embodiment of the present invention has been described above. However, the present invention is not limited to the embodiment, and thus different configurations may be adopted. For example, in the above embodiment, the microprocessor (detector) having a plurality of input channels and a plurality of output channels has been given. Instead of this, with a multiplexer, a predetermined voltage may be selectively applied to each of a plurality of electroconductive plates CP. Then, the applied voltage at the electroconductive plate CP selected with another multiplexer may be input to an AD converter.

In a case where a plurality of units each including an electroconductive plate CP and an electroconductive part CD is provided at each of a plurality of locations, microprocessors 7 may be disposed one-to-one at the locations. The microprocessors 7 may each have the electroconductive plate CP and the electroconductive part CD of each of the plurality of units, connected thereto. The microprocessors 7 may each sequentially inspect the presence or absence of water intrusion at the location.

What is claimed is:

1. A combination weighing device comprising:
  an electroconductive plate opposed, with an interval, to an electroconductive part that enables detection of water intrusion inside the combination weighing device and constitutes a part of the combination weighing device;
  a voltage wire for application of voltage to the electroconductive plate; and
  a detector that detects a potential difference between the electroconductive part and the electroconductive plate, wherein
  the detector or a controller of the combination weighing device determines presence or absence of water intrusion inside the interval, based on the detected potential difference.

2. The combination weighing device according to claim 1, wherein
  the electroconductive part corresponds to at least one of a part that gets wet due to water having intruded inside the combination weighing device and a part at which water stays inside the combination weighing device.

3. The combination weighing device according to claim 1, wherein
  a plurality of the electroconductive plates is disposed at a plurality of locations on the electroconductive part,
  the detector has a plurality of input channels for selective input of the applied voltages at the respective electroconductive plates disposed at the plurality of locations, and
  the detector or the controller of the combination weighing device determines presence or absence of water intrusion at the location of each of the electroconductive plates due to the selective input.

4. The combination weighing device according to claim 1, wherein
  the interval between the electroconductive part and the electroconductive plate retains, due to surface tension of water, the water.

5. The combination weighing device according to claim 4, wherein
  the electroconductive plate is attached to the electroconductive part through a double-sided adhesive tape having insulation and having a thickness equivalent to the interval.

6. The combination weighing device according to claim 5, wherein
  the electroconductive plate to which the double-sided adhesive tape has been attached has an area in which the double-sided adhesive tape is not present.

7. The combination weighing device according to claim 3, wherein
  the detector includes a microprocessor that converts the potential difference into digital quantity, and
  the microprocessor has a plurality of output channels for selective application of voltage to the plurality of the electroconductive plates.

8. A combination weighing device comprising:
  a housing that has a bottom surface;
  a flat electroconductive plate attached to the bottom surface and opposed, with an interval in a direction orthogonal to a surface of the flat electroconductive plate, to a flat electroconductive part enabling detection of water intrusion inside the combination weighing device, wherein the interval is capable of retention of water;
  a voltage wire for application of voltage to the flat electroconductive plate; and
  a detector that detects a potential difference between the flat electroconductive part and the flat electroconductive plate, wherein
  the detector or a controller of the combination weighing device determines presence or absence of water intrusion inside the interval, based on the detected potential difference.

* * * * *